(12) United States Patent
Lu et al.

(10) Patent No.: US 8,854,760 B1
(45) Date of Patent: Oct. 7, 2014

(54) SYSTEMS AND METHODS FOR PREVENTING ADJACENT TRACK ERASURE

(71) Applicant: LSI Corporation, San Jose, CA (US)

(72) Inventors: Lu Lu, San Jose, CA (US); Haitao Xia, San Jose, CA (US); Jianzhong Huang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/886,170

(22) Filed: May 2, 2013

Related U.S. Application Data

(60) Provisional application No. 61/811,097, filed on Apr. 11, 2013.

(51) Int. Cl.
*G11B 5/09* (2006.01)
*G11B 20/18* (2006.01)

(52) U.S. Cl.
CPC .................................. *G11B 20/18* (2013.01)
USPC .................... 360/53; 360/57; 360/39; 360/31

(58) Field of Classification Search
None
See application file for complete search history.

(56) References Cited

U.S. PATENT DOCUMENTS

| | | | |
|---|---|---|---|
| 7,649,704 B1 * | 1/2010 | Bombet et al. ................... | 360/31 |
| 7,872,822 B1 * | 1/2011 | Rothberg ......................... | 360/31 |
| 8,250,434 B2 | 8/2012 | Yang | |
| 2012/0063022 A1 | 3/2012 | Mathew | |
| 2012/0063024 A1 | 3/2012 | Mathew | |
| 2012/0063284 A1 | 3/2012 | Mathew | |

OTHER PUBLICATIONS

Gibson et al "Directions for Shingled-Write and Two-Dimensional Magnetic Recording System" Architectures: Synergies with Solid-State Disks Carnegie Mellon Univ. May 1, 2009.
U.S. Appl. No. 13/777,915, Unpublished (filed Feb. 26, 2013) (Jun Xiao).
Wu, et al., "Equation Based LDPC Decoder for Intersymbol Interference Channels" 2005 IEEE International Conf. on Acoustics, Speech, and Signal Processing vol. 5 Mar. 2005.

* cited by examiner

*Primary Examiner* — Muhammad N Edun
(74) *Attorney, Agent, or Firm* — Hamilton DeSanctis & Cha

(57) ABSTRACT

A data processing circuit includes a subtraction circuit operable to subtract an ideal version of a data pattern from a sampled version of a data pattern to yield a difference signal, an error calculation circuit operable to calculate an error between the ideal version of the data pattern and the sampled version of the data pattern based on the difference signal, and a comparator circuit operable to compare the error with a threshold value and operable to assert a track refresh signal if the error is greater than the threshold value. The track refresh signal is operable to trigger a magnetic storage device to refresh data on a data track.

20 Claims, 4 Drawing Sheets

SYSTEMS AND METHODS FOR PREVENTING ADJACENT TRACK ERASURE

CROSS REFERENCE TO RELATED APPLICATIONS

The present application claims priority to (is a non-provisional of) U.S. Pat. App. No. 61/811,097, entitled "Systems and Methods for Preventing Adjacent Track Erasure", and filed Apr. 11, 2013 by Lu et al, the entirety of which is incorporated herein by reference for all purposes.

FIELD OF THE INVENTION

Various embodiments of the present invention provide systems and methods for preventing adjacent track erasure, and more particularly to systems and methods for determining when to refresh adjacent data tracks when writing to a data track on a storage medium.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data. When a track is written too many times before an adjacent track is refreshed or rewritten, the data recorded on the adjacent track can be distorted by the write operations performed on the target track.

SUMMARY

Various embodiments of the present invention provide systems and methods for preventing adjacent track erasure, and more particularly to systems and methods for determining when to refresh adjacent data tracks when writing to a data track on a storage medium.

A data processing circuit is disclosed including a subtraction circuit operable to subtract an ideal version of a data pattern from a sampled version of a data pattern to yield a difference signal, an error calculation circuit operable to calculate an error between the ideal version of the data pattern and the sampled version of the data pattern based on the difference signal, and a comparator circuit operable to compare the error with a threshold value and operable to assert a track refresh signal if the error is greater than the threshold value. The track refresh signal is operable to trigger a magnetic storage device to refresh data on a data track.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

Various embodiments of the present invention provide systems and methods for preventing adjacent track erasure, and more particularly to systems and methods for determining when to refresh adjacent data tracks when writing to a data track on a storage medium. Adjacent track erasure is prevented when writing a data track by refreshing adjacent tracks when a calculated error signal for an adjacent track is greater than a threshold, indicating that it is beginning to degrade or to become distorted. In some embodiments, the error signal is calculated based on either the X samples and X ideals or on the Y samples and Y ideals. In some embodiments, the error signal is calculated using a mean squared error (MSE) algorithm.

The adjacent track erasure prevention system is triggered in some embodiments using a write counter for each data track on a storage medium, and when the write counter for a data track exceeds a threshold, one or both of the adjacent data tracks are analyzed and refreshed if needed.

Data tracks are refreshed in any suitable manner, such as by reading and re-writing the data to the same location or by reading the data, writing the data to a different location, and marking the original location as empty.

Figure 1:
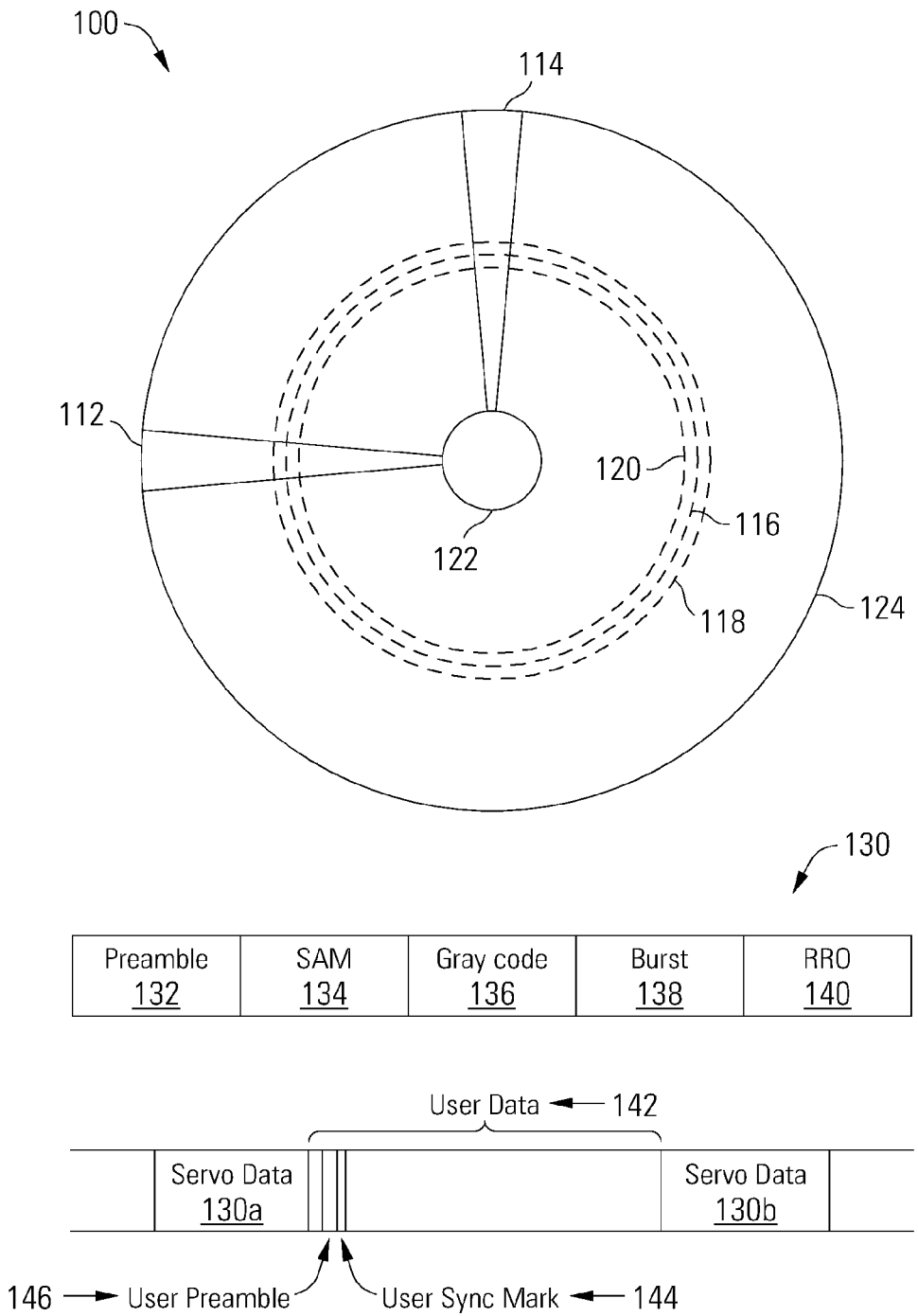
FIG. 1 is a block diagram of a magnetic storage medium and sector data scheme that may be used with a system and method for preventing adjacent track erasure in accordance with some embodiments of the present invention.

Turning to FIG. 1, a magnetic storage medium 100 with servo wedges (e.g., 112, 114) containing servo data is depicted in accordance with one or more embodiments of the present invention. An example data track 116 and its two adjacent data tracks 118, 120 are shown, indicated as dashed lines. The tracks 116, 118, 120 are segregated by servo data written within wedges 112, 114. It should be noted that while two tracks 116, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, followed by a Gray code 136, a burst field 138, and a repeatable run-out (RRO) field 140. It should be noted that a servo data set may have two or more fields of burst information. Further, it should be noted that different information may be included in the servo fields. Between the servo data bit patterns 130a and 130b, a user data region 142 is provided. User data region 142 may include one or more sets of data that are stored to storage medium 100. The data sets may include user synchronization information some of which may be used as a mark to establish a point of reference from which processing of the data within user data region 142 may begin.

The systems and methods for preventing adjacent track erasure are operable in some embodiments to detect distortion in user data 142 and to refresh distorted user data 142.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

During a write operation to user data in track 116, if the write counter for track 116 exceeds a threshold, the user data for adjacent track 120 is read back, analyzed for errors, and if the error exceeds a threshold, user data in track 120 is refreshed. The user data for adjacent track 118 is read back, analyzed for errors, and if the error exceeds a threshold, user data in track 118 is refreshed. In other embodiments, only one adjacent track is analyzed and refreshed, such as but not limited to an adjacent track that was previously read.

Figure 2:
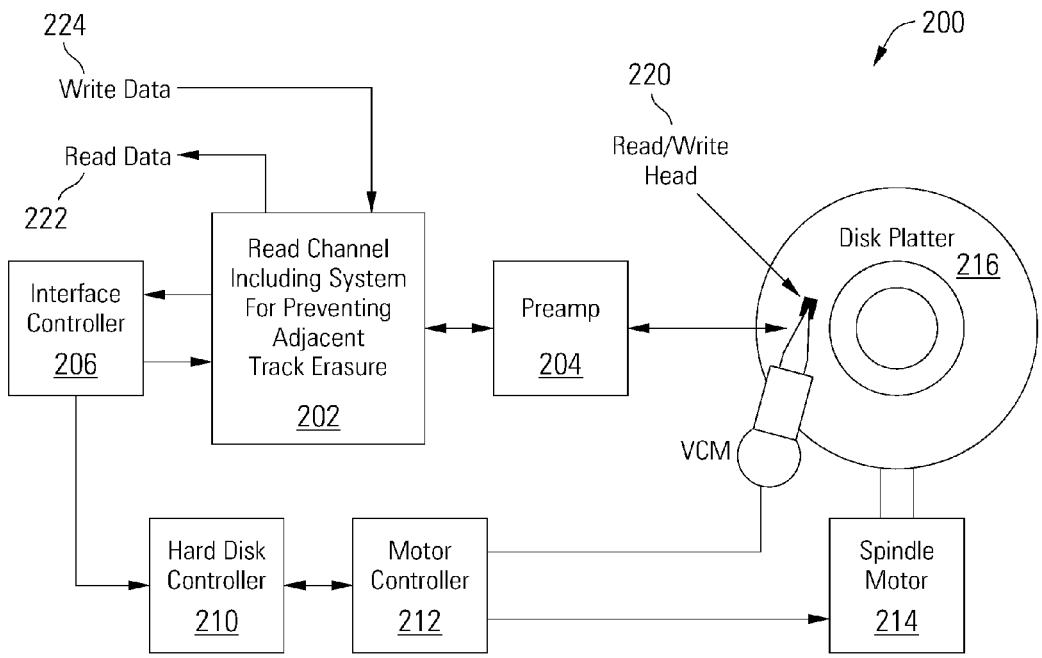
FIG. 2 depicts a storage system including a read channel with a system for preventing adjacent track erasure in accordance with some embodiments of the present invention.

Turning to FIG. 2, a storage system 200 is disclosed which includes a read channel circuit 202 with a system for preventing adjacent track erasure in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 decodes and digitizes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. While writing data, read channel circuit 202 uses a system for preventing adjacent track erasure as disclosed herein. Such a system for preventing adjacent track erasure may be implemented consistent with that disclosed in relation to FIGS. 3-4. In some cases, a method of writing data while preventing adjacent track erasure may be performed consistent with the flow diagram disclosed in relation to FIG. 5.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 200 may be modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
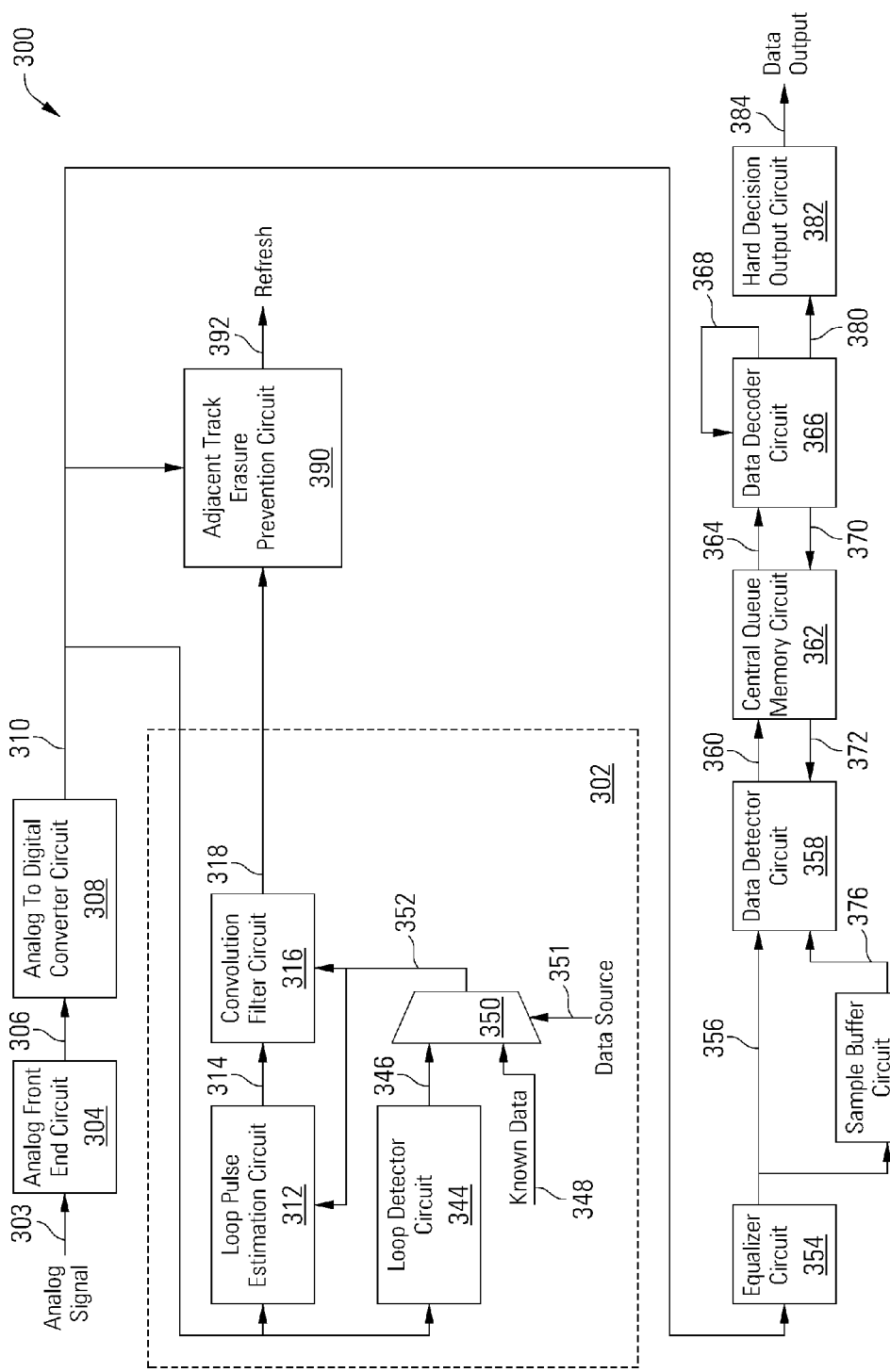
FIG. 3 is a block diagram of a data processing circuit including an adjacent track erasure prevention circuit in accordance with some embodiments of the present invention.

FIG. 3 depicts a data processing circuit 300 including an adjacent track erasure prevention circuit 390 in accordance with some embodiments of the present invention. Data processing circuit 300 includes an analog front end circuit 304 that receives an analog signal 303. Analog front end circuit 304 processes analog signal 303 and provides a processed analog signal 306 to an analog to digital converter circuit 308.

Analog front end circuit 308 may include, but is not limited to, an analog filter and an amplifier circuit as are known in the art. Based upon the disclosure provided herein, one of ordinary skill in the art will recognize a variety of circuitry that may be included as part of analog front end circuit 308. In some cases, analog input signal 303 is derived from a read/write head assembly (not shown) that is disposed in relation to a storage medium (not shown). In other cases, analog signal 303 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog signal 303 may be derived.

Analog to digital converter circuit 308 converts processed analog signal 306 into a corresponding series of digital samples 310. Digital samples 310 (and signals derived there from) prior to being processed by an equalizer circuit 354 are considered X samples. Analog to digital converter circuit 308 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 308 are provided to loop processing circuit 302, to adjacent track erasure prevention circuit 390, and to backend processing circuit 394. Loop processing circuit 302 provides X ideal values 318 that may be used by adjacent track erasure prevention circuit 390 to detect data distortion in adjacent tracks. Loop processing circuit 302 may also perform functions in some embodiments such as, but not limited to, removing DC noise from digital samples 310, adjusting sampling rates, controlling filtering and gain of analog front end circuit 304, to increase the likelihood that backend processing circuit 394 will successfully detect the correct values of digital samples 310. Based upon the disclosure provided herein, one of ordinary skill in the art will recognize a variety of loop processing circuits that may be included in loop processing circuit 302 in various embodiments of the present invention.

Backend processing circuit 394 is used to detect the correct values of digital samples 310, yielding hard decisions 384. In some embodiments, hard decisions 384 are used to generate Y ideal values used by adjacent track erasure prevention circuit 390 in conjunction with Y samples 356 to detect data distortion in adjacent tracks.

The loop processing circuit 302 includes a loop pulse estimation circuit 312, a convolution filter circuit 316, a loop detector circuit 344, and a selector circuit 350. Loop detector circuit 344 receives digital samples 310 from analog to digital converter circuit 308 and yields a detected output 346. Data detector circuit 344 is a data detector circuit capable of producing a detected output 346 by applying a data detection algorithm to a data input. In some embodiments, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 344 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

In some cases or operating states, the detected output 346 may be replaced by known data 348 using a data source selector 351 to control a selector circuit 350 to yield as output 352 either known data 348 or detected output 346.

The loop pulse estimation circuit 312 also receives digital samples 310 (or X samples) and detected output 352 and yields an X target 314, a partial response target based on the digital samples 310 and on actual values 352 of the digital samples 310. Loop pulse estimation circuit 312 may be any circuit known in the art that is capable of processing digital samples 310 and corresponding actual values 352 to derive a partial response target. Based upon the disclosure provided herein, one of ordinary skill in the art will recognize a variety of loop pulse estimation circuits that may be used in relation to different embodiments of the present invention.

Convolution filter circuit 316 may be any circuit known in the art that is capable of applying target based filtering to an input signal to yield an output conformed to a target. In this case, convolution filter circuit 316 applies target filtering to detected output 352 to yield X ideal values 318, using the X target 314 from loop pulse estimation circuit 312. In some embodiments, the convolution filter circuit 316 convolves the X target 314 with either the detected output 346 from loop detector circuit 344 or with known data 348 to yield the target filtered output 318. X ideal values 318 are an ideal approximation of digital samples 310.

The adjacent track erasure prevention circuit 390 calculates the error between the digital samples 310, the actual signal read from the track adjacent the track being written, and the X ideal values 318, the ideal approximation of the signal read from the track adjacent the track being written. If the error is greater than a threshold, the adjacent track erasure prevention circuit 390 determines that the adjacent track has become distorted, the assumption is made that adjacent track erasure has occurred, and the refresh signal 392 is asserted. When the refresh signal 392 is asserted, the adjacent track is refreshed in any suitable manner by the storage device. In some embodiments, the storage device controller reads the adjacent track and rewrites the adjacent track in place, so that the correct values are more strongly written in place.

An equalizer circuit 354 in backend processing circuit 394 receives digital samples 310 and applies an equalization algorithm to digital samples 310 to yield an equalized output 356, or Y samples. In some embodiments of the present invention, equalizer circuit 354 is a digital finite impulse response filter circuit as are known in the art. Equalized output 356 is stored to a sample buffer circuit 374 that includes sufficient memory to maintain one or more codewords until processing of that codeword is completed through a data detector circuit 358 and a data decoder circuit 366 including, where warranted, multiple "global iterations" defined as passes through both data detector circuit 358 and data decoder circuit 366 and/or "local iterations" defined as passes through data decoding circuit 366 during a given global iteration. Sample buffer circuit 374 stores the received data as buffered data 376.

Data detector circuit 358 is a data detector circuit capable of producing a detected output 360 by applying a data detection algorithm to a data input. In some embodiments, the data detection algorithm may be but is not limited to, a Viterbi algorithm detection algorithm or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 358 may provide both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 360 is provided to a central queue memory circuit 362 that operates to buffer data passed between data detector circuit 358 and data decoder circuit 366. When data decoder circuit 366 is available, data decoder circuit 366 receives detected output 360 from central queue memory 362 as a decoder input 364. Data decoder circuit 366 applies a data decoding algorithm to decoder input 364 in an attempt to recover originally written data. The result of the data decoding algorithm is provided as a decoded output 370. Similar to detected output 360, decoded output 370 may include both hard decisions and soft decisions. Data decoder circuit 366 may be any data decoder circuit known in the art that is capable of applying a decoding algorithm to a received input. Data decoder circuit 366 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 366 provides the result of the data decoding algorithm as a data output 380. Data output 380 is provided to a hard decision output circuit 382 where the data is reordered before providing a series of ordered data sets as a data output 384.

One or more iterations through the combination of data detector circuit 358 and data decoder circuit 366 may be made in an effort to converge on the originally written data set. As mentioned above, processing through both the data detector circuit and the data decoder circuit is referred to as a "global iteration". For the first global iteration, data detector circuit 358 applies the data detection algorithm without guidance from a decoded output. For subsequent global iterations, data detector circuit 358 applies the data detection algorithm to buffered data 376 as guided by decoded output 370. Decoded output 370 is received from central queue memory 362 as a detector input 372.

During each global iteration it is possible for data decoder circuit 366 to make one or more local iterations including application of the data decoding algorithm to decoder input 364. For the first local iteration, data decoder circuit 366 applies the data decoder algorithm without guidance from a decoded output 368. For subsequent local iterations, data decoder circuit 366 applies the data decoding algorithm to decoder input 364 as guided by a previous decoded output 368.

Notably, an adjacent track erasure prevention circuit 390 may be used in data processing systems other than that disclosed in FIG. 3. Where used in a data processing system such as that disclosed in FIG. 3, the adjacent track erasure prevention circuit 390 can be used to detect adjacent track erasure based, for example, on X samples (e.g., 310) and X ideals (e.g., 318) or on Y samples (e.g., 356) and Y ideals (obtained using a partial response target convolved with hard decisions 380).

Figure 4:
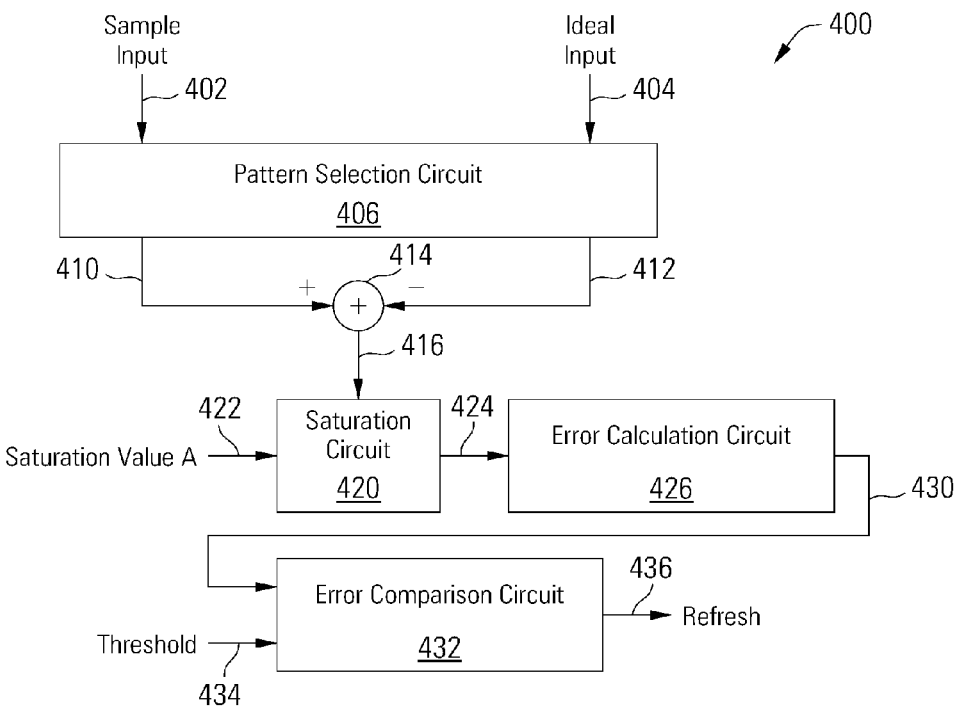
FIG. 4 is a block diagram of an adjacent track erasure prevention circuit in accordance with some embodiments of the present invention.

Turning now to FIG. 4, an adjacent track erasure prevention circuit 400 is shown in accordance with some embodiments of the present invention. A pattern selection circuit 406 receives the sample input 402 and the ideal input 404. In some embodiments, the sample input 402 is an X sample, or a series of samples from an analog to digital converter, and the ideal input 404 is an X ideal, or the ideal version of the samples at sample input 402. In other embodiments, the sample input 402 is a Y sample, or a series of equalized digital samples from a digital finite impulse response filter, and the ideal input 404 is a Y ideal, or the ideal version of the samples at sample input 402. The ideal values are obtained in some embodiments by performing convolutions between non-return to zero (nrz) channel data, either known data or hard decisions, and partial response targets. This is accomplished in some embodiments by applying a data detection algorithm to detect correct values for data samples, and convolving them with a partial response target.

The pattern selection circuit 406 selects pattern segments from sample input 402 and ideal input 404 to be analyzed for adjacent track erasure, outputting the pattern segment from the sample input 402 at sample output 410 and the pattern segment from ideal input 404 at ideal output 412. In some embodiments, the pattern selection circuit 406 is operable to acquire a predetermined number N of consecutive bits from both the sample input 402 and the ideal input 404 at a particular time so that the selected bits from sample input 402 and ideal input 404 are correlated, such as every M bits at the input, where M>>N. The adjacent track erasure prevention circuit 400 can detect data distortion or error given any data patterns, and thus in some embodiments, the pattern selection circuit 406 selects data patterns based on clock cycle count or time rather than on pattern content. Based upon the disclosure provided herein, one of ordinary skill in the art will recognize a variety of circuitry that may be included as part of pattern selection circuit 406 to periodically sample the signals at sample input 402 and ideal input 404 for outputs 410 and 412.

The pattern segment at ideal output 412 is subtracted from the pattern segment at sample output 410 in adder 414 (or equivalently, in a subtraction circuit), yielding difference signal 416. A saturation circuit 420 saturates the difference signal 416 based on a saturation value A 422, yielding a saturated difference signal 424. In some embodiments, saturation circuit 420 is operable to implement the following algorithm: if error>A, error=A; if error<−A, error=−A. Thus, saturation circuit 420 limits the difference to the saturation value A 422. Based upon the disclosure provided herein, one of ordinary skill in the art will recognize a variety of circuitry that may be included as part of saturation circuit 420.

An error calculation circuit 426 calculates an error signal 430 based on the saturated difference signal 424. In some embodiments, error calculation circuit 426 is operable to calculate the mean squared error of saturated difference signal 424. In some of these embodiments, error calculation circuit 426 includes a squaring circuit, accumulator and summing circuit, and mean calculation circuit. Based upon the disclosure provided herein, one of ordinary skill in the art will recognize a variety of circuitry that may be included as part of error calculation circuit 426.

An error comparison circuit 432 compares the error signal 430 with a threshold 434, and if the error signal 430 is greater than the threshold 434, the error comparison circuit 432 asserts a refresh signal 436. In some embodiments, the threshold 434 is programmable. The threshold value can thus be set to control the error level at which a track is refreshed, which is a determination that involves a large number of factors, such as the ability of the data processing system to correct errors, the amount of time it takes to refresh a track and the amount of time available for refreshing tracks, etc. In addition, some errors are to be expected during normal operation even in the absence of inter-track interference and adjacent track erasure, so refreshing a track may not reduce the error signal to zero.

The adjacent track erasure prevention circuit 400 reduces data errors caused by inter-track interference and operates based on any data patterns that may result from different coding sequences and channel conditions. The calculation of the mean squared error based on the X samples and X ideals or Y samples and Y ideals is a simple operation that does not require complex hardware and does not greatly increase latency in the system. The track write count, frequency of pattern selection and error threshold may all be programmable to adjust the sensitivity, operational cost and robustness of the adjacent track erasure prevention.

Figure 5:
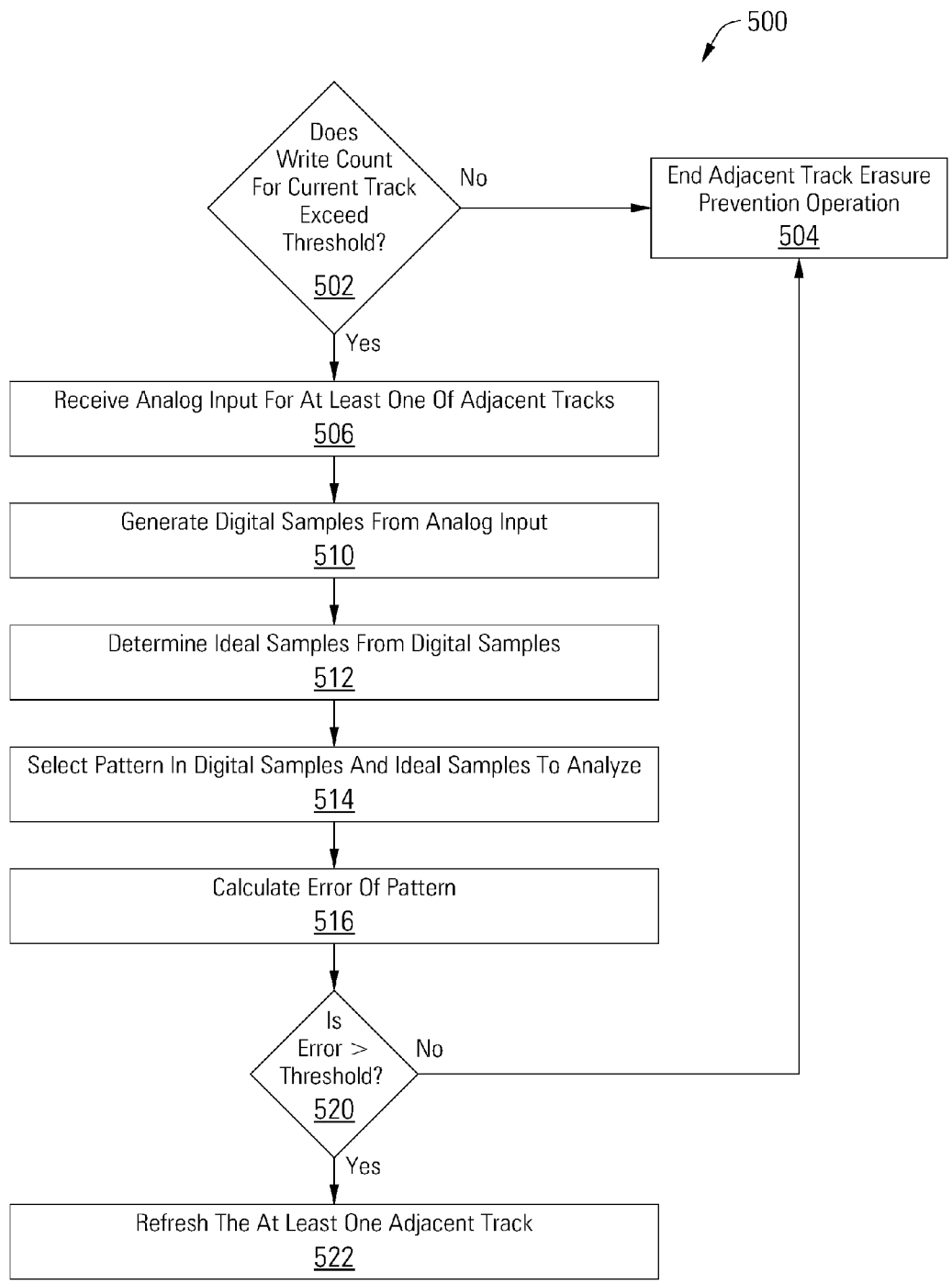
FIG. 5 is a flow diagram showing a method for preventing adjacent track erasure when writing to a data track in accordance with some embodiments of the present invention.

Turning now to FIG. 5, a flow diagram 500 shows a method in accordance with one or more embodiments of the present invention for preventing adjacent track erasure when writing to a data track on a storage medium. The method may be performed before, during or after a write to a data track. Following flow diagram 500, a determination is made as to whether a write count for a current track exceeds a threshold. (Block 502) The threshold may be programmable to adjust the point at which tracks adjacent to the track being written are analyzed for distortion. In some embodiments, the write count reflects the number of times the current track has been written since the adjacent tracks were written or refreshed. This is accomplished, for example, by keeping two write counters for each track, one associated with each adjacent track, and by resetting the write counter when the corresponding adjacent track is written or refreshed. If the write count for the current track does not exceed the threshold, the adjacent track prevention operation is finished. (Block 504) If the write count for the current track does exceed the threshold, an analog input for at least one of the adjacent tracks is received to be analyzed for adjacent track erasure. (Block 506) Digital samples are generated from the analog input. (Block 510) In some embodiments, the digital samples are X samples, obtained at the output of an analog to digital converter used to generate the digital samples. In other embodiments, the digital samples are equalized digital samples or Y samples, obtained at the output of a digital finite impulse response filter.

Ideal samples are generated for the digital samples. (Block 512) In some embodiments, the ideal samples are X ideals, or the ideal version of the X samples. In other embodiments, the ideal samples are Y ideals, or the ideal version of the Y samples. The ideal values are obtained in some embodiments by performing convolutions between non-return to zero (nrz) channel data, either known data or hard decisions, and partial response targets. This can be accomplished by applying a data detection algorithm to detect correct values for data samples, and convolving them with a partial response target.

A pattern in the digital samples and the ideal samples is selected to analyze. (Block 514) In some embodiments, this is accomplished by periodically selecting a number of bits of the digital samples and the same number of corresponding bits of the ideal samples from a stream of digital samples and ideal samples. The error in the pattern is calculated. (Block 516) In some embodiments, the error in the pattern is calculated by subtracting the ideal samples from the digital samples, saturating or limiting the result, and then calculating the mean squared error.

A determination is made as to whether the error in the pattern is greater than a threshold. (Block 520). If not, the adjacent track prevention operation is finished. (Block 504) If so, the at least one adjacent track is refreshed. (Block 522) The at least one adjacent track can be refreshed by reading the data and re-writing it in place, or by moving it to another location so that it is written in a more current fashion.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for preventing adjacent track erasure upon writing to a data track on a storage medium. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit comprising:
    a subtraction circuit operable to subtract an ideal version of a data pattern from a sampled version of the data pattern to yield a difference signal;
    an error calculation circuit operable to calculate an error between the ideal version of the data pattern and the sampled version of the data pattern based on the difference signal; and
    a comparator circuit operable to compare the error with a threshold value and operable to assert a track refresh signal if the error is greater than the threshold value, wherein the track refresh signal is operable to trigger a magnetic storage device to refresh data on a data track.

2. The data processing circuit of claim 1, wherein the data processing circuit is operable to analyze the data track on a storage medium with the comparator circuit when an adjacent track to the data track is written.

3. The data processing circuit of claim 2, further comprising a track write counter for each of a plurality of data tracks on the storage medium, wherein the track write counters are incremented each time a corresponding one of the plurality if data tracks are written.

4. The data processing circuit of claim 2, wherein the data processing circuit is operable to trigger the analyzing based in part on a number of times the data track has been written since the adjacent track was last written.

5. The data processing circuit of claim 1, wherein the data processing circuit is operable to refresh the data track when an adjacent data track is written to reduce adjacent track erasure when the error is greater than the threshold value.

6. The data processing circuit of claim 1, further comprising a pattern selection circuit operable to obtain the sampled version of the data pattern and the ideal version of the data pattern from a sampled data stream and an ideal data stream.

7. The data processing circuit of claim 6, wherein the pattern selection circuit is operable to select a number of bits from each group of bits in the sampled data stream and the ideal data stream.

8. The data processing circuit of claim 1, wherein the threshold value is programmable.

9. The data processing circuit of claim 1, wherein the error calculation circuit comprises a mean squared error calculation circuit.

10. The data processing circuit of claim 1, further comprising a saturation circuit operable to limit the difference signal to a predetermined value.

11. The data processing circuit of claim 1, further comprising an analog to digital converter operable to generate the sampled version of the data pattern from an analog input.

12. The data processing circuit of claim 11, wherein the sampled version of the data pattern comprises X samples from the analog to digital converter.

13. The data processing circuit of claim 11, further comprising a digital finite impulse response filter operable to equalize an output of the analog to digital converter, wherein the sampled version of the data pattern comprises an output of the digital finite impulse response filter, and wherein the sampled version of the data pattern comprises an output of the digital finite impulse response filter comprises Y samples.

14. The data processing circuit of claim 1, wherein the circuit is implemented as an integrated circuit.

15. A method for preventing adjacent track erasure, comprising:
 based on a write operation to an adjacent data track on a storage medium, performing a track erasure prevention operation comprising:
  obtaining a data pattern from a data track;
  calculating an ideal value for the data pattern;
  calculating an error value between the data pattern and the ideal value for the data pattern;
  comparing the error value with a threshold; and
  refreshing the data track when the error value is greater than the threshold, wherein the track erasure prevention operation is triggered when a count of write operations to the adjacent data track exceeds a threshold.

16. The method of claim 15, wherein calculating the error value comprises calculating a mean squared error between the data pattern and the ideal value for the data pattern.

17. The method of claim 15, wherein calculating the ideal value for the data pattern comprises calculating a hard decision for the data pattern and performing a convolution operation between the hard decision and a partial response target.

18. The method of claim 15, further comprising reading a programmable value for the threshold.

19. A storage device, comprising:
 a storage medium;
 a head assembly disposed in relation to the storage medium and operable to provide a sensed signal corresponding to a data set on the storage medium; and
 a read channel circuit comprising an adjacent track erasure prevention circuit, the adjacent track erasure prevention circuit comprising:
  a subtraction circuit operable to subtract an ideal version of a data pattern from a sampled version of the data pattern to yield a difference signal;
  an error calculation circuit operable to calculate an error between the ideal version of the data pattern and the sampled version of the data pattern based on the difference signal; and
  a comparator circuit operable to compare the error with a threshold value and operable to assert a track refresh signal if the error is greater than the threshold value, wherein the track refresh signal is operable to cause the head assembly to refresh data on a data track.

20. The storage device of claim 19, wherein the adjacent track erasure prevention circuit is operable to refresh the data on the data track when an adjacent data track is written.

\* \* \* \* \*